United States Patent
Venkitaraman et al.

(10) Patent No.: US 8,027,342 B2
(45) Date of Patent: Sep. 27, 2011

(54) METHOD AND APPARATUS FOR ESTABLISHING PEER-TO-PEER COMMUNICATIONS

(75) Inventors: Narayanan Venkitaraman, Palatine, IL (US); Ross J. Lillie, Hoffman Estates, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 521 days.

(21) Appl. No.: 11/614,959

(22) Filed: Dec. 21, 2006

(65) Prior Publication Data

US 2008/0151778 A1     Jun. 26, 2008

(51) Int. Cl.
*H04L 12/26* (2006.01)
*H04L 12/56* (2006.01)

(52) U.S. Cl. ......... 370/392; 370/254; 370/260; 370/546

(58) Field of Classification Search .......... 370/546, 370/254, 260, 392

See application file for complete search history.

(56) References Cited

U.S. PATENT DOCUMENTS

| | | | |
|---|---|---|---|
| 6,078,575 A * | 6/2000 | Dommety et al. | 370/338 |
| 6,330,070 B1 * | 12/2001 | Toyoda et al. | 358/1.15 |
| 6,810,259 B1 * | 10/2004 | Zhang | 455/456.5 |
| 6,850,495 B1 | 2/2005 | Baum et al. | |
| 7,421,708 B2 * | 9/2008 | Vass et al. | 719/320 |
| 2002/0098849 A1 | 7/2002 | Bloebaum et al. | |
| 2002/0147771 A1 * | 10/2002 | Traversat et al. | 709/203 |
| 2002/0165979 A1 * | 11/2002 | Vincent | 709/239 |
| 2003/0126464 A1 * | 7/2003 | McDaniel et al. | 713/201 |
| 2004/0260761 A1 * | 12/2004 | Leaute et al. | 709/201 |
| 2005/0021617 A1 * | 1/2005 | Rusitschka | 709/204 |
| 2005/0143078 A1 | 6/2005 | Wilson et al. | |
| 2006/0117026 A1 * | 6/2006 | Kaler et al. | 707/10 |
| 2007/0021137 A1 * | 1/2007 | Kokkonen et al. | 455/518 |

OTHER PUBLICATIONS

Bhatia, K., "Peer-to-Peer Requirements on the Open Grid Services Architectures Framework," OGSAP2P Research Group, Jul. 12, 2005 [retrieved Feb. 19, 2008] Retrieved from the Internet. <URL: http://www.ogf.org/documents/GFD.49.pdf>, p. 5. Relevant to claim 4.

Lee W. Young, "PCT/US2007/082599—Pct International Search Report and Written Opinion," WIPO, ISA/US, Commissioner for Patents, Alexandria, VA, USA, Mar. 18, 2008.

Dorothee Mulhausen, "PCT/US2007/082599—PCT International Preliminary Report on Patentability," The International Bureau of WIPO, Geneva, Switzerland, Jul. 2, 2009.

* cited by examiner

*Primary Examiner* — Dang Ton
*Assistant Examiner* — Robert M Morlan

(57) ABSTRACT

A method and apparatus that establishes peer-to-peer communications is disclosed. The method may include determining a group to which a first device belongs, determining the identity of other devices in the group, sending an initial communication to the other devices to indicate that the first device will be joining the group, informing the other devices of applications that are available at the first device, and informing the applications about each equivalent application that is available in other devices in the group.

7 Claims, 7 Drawing Sheets

METHOD AND APPARATUS FOR ESTABLISHING PEER-TO-PEER COMMUNICATIONS

BACKGROUND OF THE INVENTION

1. Field of the Invention

The invention relates to peer-to-peer communications in electronic devices.

2. Introduction

Traditional IP networking developed as an overlay on top of different types of link layers for communicating from a device to a remote device. The key applications, for instance, were the File Transfer Protocol (FTP) to move data from one device to another and the Network Virtual Terminal Protocol (TELNET) to log in to a remote device.

Utilizing this approach to communicate with a user is an after thought and is often implemented as an overlay on top of device centric Internet. For instance there is an overlay of Simple Mail Transfer Protocol (SMTP) servers to deliver email and an overlay of Session Initiation Protocol (SIP) servers to enable an end point reach a user. Internet Protocol (IP) itself is peer-to-peer in nature and was based on the end-to-end argument of intelligent end points with no service related state in the core. However, the overlays on top of it, have been based on a client-server model with relatively dumb clients and with intelligence in the servers which reside the in core network. In such a model, the clients require the core network entities to understand session/application protocols to provide value to a user. Only the network has sufficient intelligence to act as a "proxy" for the user.

Some of the reasons for such an approach to gain hold have been (a) insufficient capabilities (processing power and battery power) of end points (such mobile phones) that users often use to communicate; (b) lack of continuous presence (home PC using dialup are not always connected, cell phone may be powered off or out of coverage, etc.); and (c) low bandwidth last hop connectivity. While most of these reasons are either not valid today or will not be valid in the near future, such approaches are still the main stream.

In this scenario, there is a need for solutions that take advantage of the new end device capabilities and increasing network bandwidth and connectivity choices to (a) provide existing services at a significantly lower costs and (b) provide new services that are of tailored to the needs of users. The number of users for many new services may be small and so tailoring the core network to their needs would not have economics of scale to justify the capital and/or operational expenditure. However, there will be a large number of small groups of users with specific needs that can only be satisfied using service specific intelligence exclusively in the end points.

SUMMARY OF THE INVENTION

A method and apparatus that establishes peer-to-peer communications is disclosed. The method may include determining a group to which a first device belongs, determining the identity of other devices in the group, sending an initial communication to the other devices to indicate that the first device will be joining the group and informing the other devices of applications that are available at the first device.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are Illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method and apparatus and other embodiments that relate to the basic concepts of the invention.

This invention concerns peer-to-peer (p2p) communications using a universal identity for peering (uIP) framework. uIP is an architecture for developing a variety of p2p applications. Some of the features provided by uIP are an overlay identity space, an overlay network layer to enable reachability to the overlay identity space, and APIs to enable applications to use uIP.

uIP also enables different instances of peer entities to locate and organize themselves using the overlay identity space. For example, uIP enables multiple devices corresponding to a user, multiple devices present in a particular location or multiple devices having a copy of the same file to locate and coordinate with each other independent of their access network. Additionally, by using an overlay on top of an underlying network (such as Global System for Mobile communication (GSM) network, Internet Protocol (IP) network), the uIP enables disparate groups to communicate with each other even across different networks. The uIP in effect provides a protocol independent identity and the ability to reach between and across collections of peer instances.

Figure 1:
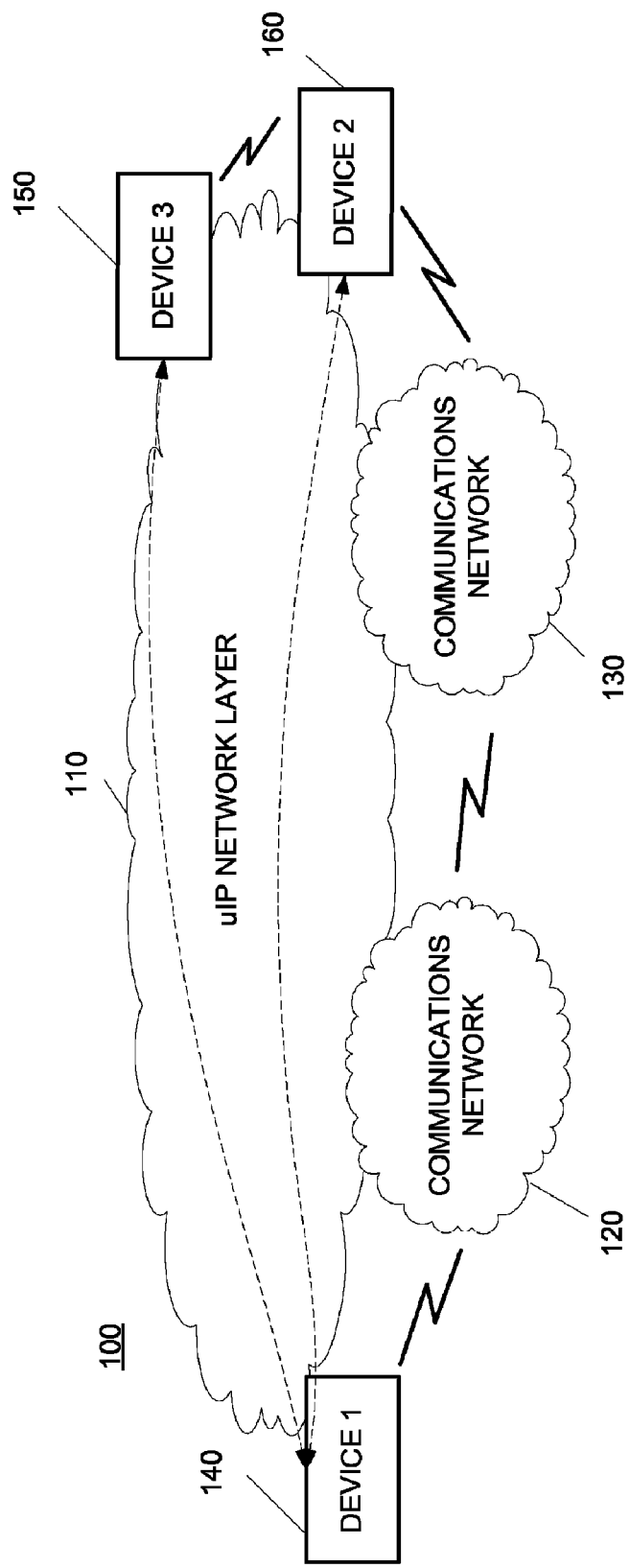
FIG. 1 illustrates an exemplary diagram of a Universal Identity for Peering (uIP) network in accordance with a possible embodiment of the invention.

FIG. 1 illustrates an exemplary diagram of a Universal Identity for Peering (uIP) network 100 in accordance with a possible embodiment of the invention In particular, the uIP network 100 may include uIP network layer 110, multiple communications networks 120, 130, and multiple devices 140, 150, 160.

Devices 140, 150, 160 may be electronic devices belonging to one person, or shared by a family, office, etc. For example, devices 140, 150, 160 may be mobile phones, wireless telephones, laptop computers, radios, personal computers, wired phones, MP3 players, portable computers, wireless radios, personal digital assistants (PDA), residential gateways or any other communication device. Devices 140, 150, 160 may communicate directly through communications networks 120, 130 or using the uIP network layer 110. Communications networks 120, 130 may represent any possible communications network, including wireless telephone networks, hardwired telephone networks, wireless local area networks (WLAN), the Internet, an intranet, etc. Note that their can be multiple co-existing uIP networks 100 with a device 140 belong simultaneously to multiple overlay networks.

Figure 2:
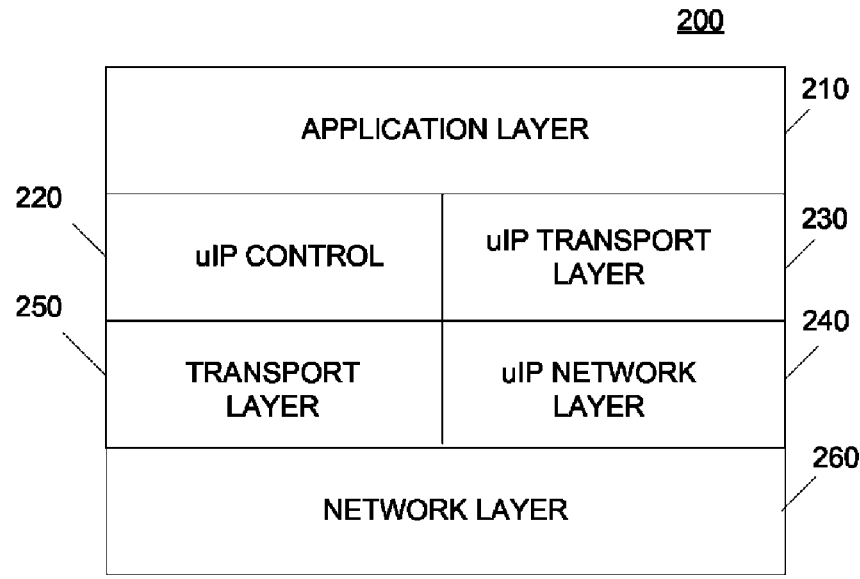
FIG. 2 is a exemplary diagram illustrating the possible position of uIP network layers in the IP suite in accordance with a possible embodiment of the invention.

FIG. 2 is an exemplary diagram illustrating the possible position of uIP network layers in the IP suite 200 in accordance with a possible embodiment of the invention. FIG. 2 shows only layers 3-5 of the five-layer IP suite 200. The uIP network layers operate between the application layer 210 and the network layer 260. The uIP network layers may include uIP control layer 220, uIP transport layer 230, and uIP network layer 240. The UIP network layer 240 is located on top of the IP network layer 260.

Figure 3:
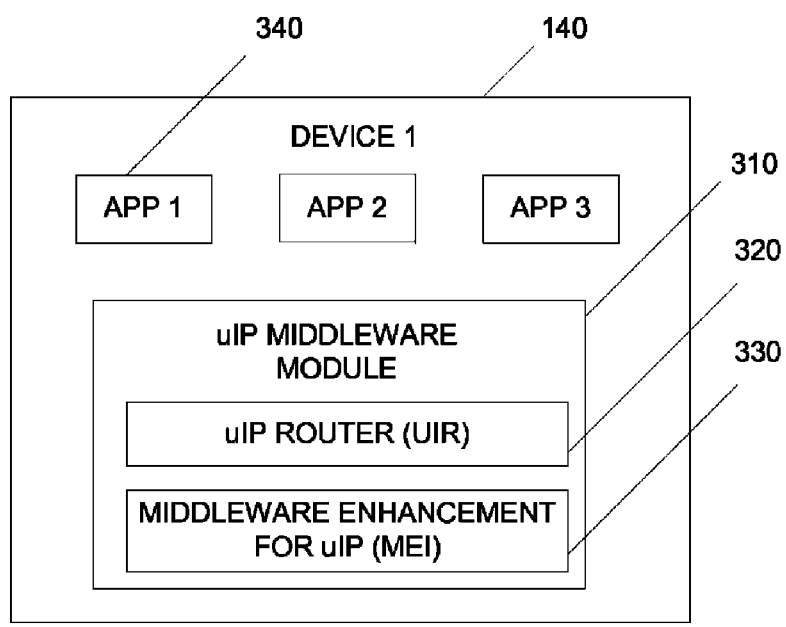
FIG. 3 is an exemplary diagram illustrating the possible applications and uIP middleware present in a communication device in accordance with a possible embodiment of the invention.

FIG. 3 is an exemplary diagram illustrating the possible applications 340 and uIP middleware module 310 present in a communication device 140 in accordance with a possible embodiment of the invention. The uIP middleware module 310 may include a logical function called UIP Router (UIR) 320 and Middleware Enhancement for uIP (MEI) 330.

The UIR 320 functions as a contact point for the group. As the contact point for the group, a primary function of a UIR 320 is to let new members of a group find other devices that are currently members of the group. In one embodiment, on receiving a request message with the right credentials from a new member, the UIR 320 provides the identities (e.g., IP address) of the other members in the response. Once the new member knows the identities of the other members, it may contact them directly or via the UIR 320. This enables existing members to learn about the new member. As described below, this exchange also enables applications on the devices to discover their peers in other devices in the group and form cliques.

A second function of the UIR 320 is to receive packets on behalf of a group and distribute it to a subset group members based on the preferences of the members of the group. As described later, based on their registration type, the UIR 320 may send either the full packet or simply an indication of the packet.

The UIR 320 function may be provided by a member of the group or an external node. For example, the UIR 320 may be highly available network box with a static IP address and which is not part of the group that it serves. Alternatively, one of the members of the group can register itself as a UIR 320. In some embodiments there is only a single UIR 320 for a group, but in some other embodiments there is more than one UIR 320 for a group. Furthermore, the UIR 320 of a group can change during the lifetime of a group. For example, when a more capable node becomes a member of a group it may become a second UIR 320 may take over some or all functions of UIR 320 from an existing UIR 320.

The MEI 330 represents an instance of a member in a group. It typically resides in the devices 140 that are part of the group. In some other embodiments it resides in a proxy device corresponding to the member of the group. The MEI 330 and the UIR 320 together form the uIP network layer 110. The MEI 330 provides functions such as:
1) Determines the group(s) to which a device belongs (based on local configuration, request from an application etc.) and registers itself (with information such as device's IP address) to the corresponding UIR 320.
2) Tracks the identities of other MEIs in the group and share capability information using information received from the UIR 320 or via Hello messages from other MEI 330.
3) Enables applications to resolve user-level identities of groups into an overlay address and directs packets destined to such addresses to the corresponding UIR 320.
4) Provides an API to enable applications to communicate within and across groups and form subgroups of cooperating members in the group. Note that the MEI 330 need not be aware of the semantics of the message contents. It simply provides the primitives to enable groups members communicate securely.

The MEI 330 may also perform functions such as provide a support for legacy applications (for example by exposing an IPv4 or IPv6 compatible version of overlay identity to applications and removing overlay network headers or uIP related information in a packet and transforming it to standard IP packets), update the UIR 320 with information about services for which the member is actively receiving packet and services for which packets need not be sent to the MEI, enable optimized routing between MEI 330 without going via UIR 320 and track the liveliness of a UIR 320.

Figure 4:
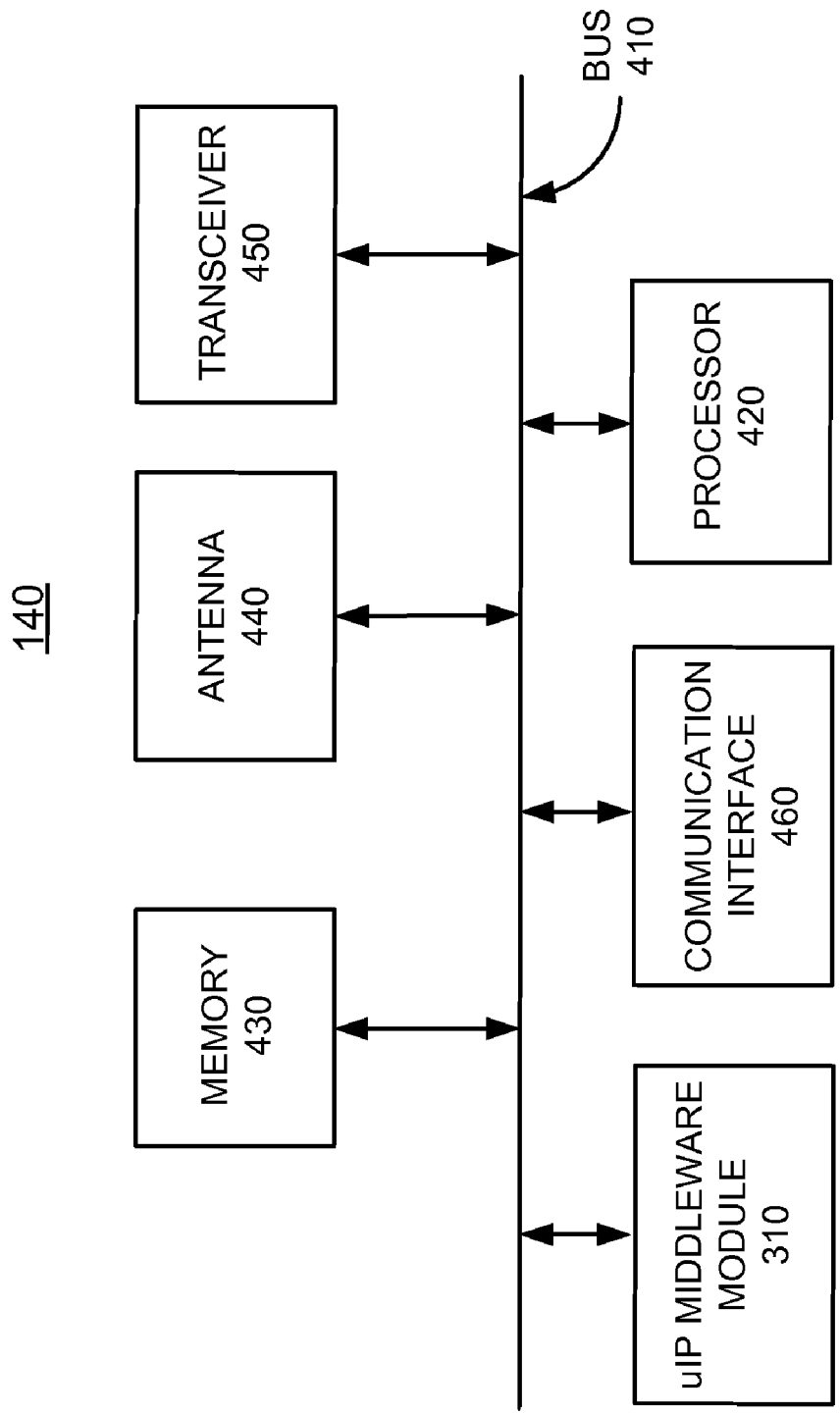
FIG. 4 illustrates an exemplary diagram of a communication device for implementing the peer-to-peer communication process in accordance with a possible embodiment of the invention.

FIG. 4 illustrates an exemplary diagram of a communication device 140 for implementing the peer-to-peer communication process in accordance with a possible embodiment of the invention. The exemplary communication device 140 may include a bus 410, a processor 420, a memory 430, an antenna 440, a transceiver 450, a communication interface 460, and a uIP middleware module 310. Bus 410 may permit communication among the components of the communication device 140.

The uIP middleware module 310 was discussed in detail above in relation to FIG. 3. Processor 420 may include at least one conventional processor or microprocessor that interprets and executes instructions. Memory 430 may be a random access memory (RAM) or another type of dynamic storage device that stores information and instructions for execution by processor 420. Memory 430 may also store temporary variables or other intermediate information used during execution of instructions by processor 420. Memory 430 may also include a read-only memory (ROM) which may include a conventional ROM device or another type of static storage device that stores static information and instructions for processor 420. Memory 430 may include a storage device that stores any type of media, such as, for example, magnetic or optical recording media and its corresponding drive.

Transceiver 450 may include one or more transmitters and receivers. The transceiver to 450 may include sufficient functionality to interface with any network or communications station and may be defined by hardware or software in any manner known to one of skill in the art. The transceiver 450 may be operable to support communication activities and links within the uIP network 100. The processor 420 is cooperatively operable with the transceiver 450 to support operations within the uIP network 100.

Communication interface 460 may include any mechanism that facilitates the communication via the communications network 100. For example, communication interface 460 may include a modem. Alternatively, communication interface 460 may include other mechanisms for assisting the transceiver 450 in communicating with other devices and/or systems via wireless connections. In some implementations of the uIP network 100, communication interface 460 may not be included in the exemplary communication device 140 when the communications handover process is implemented completely within the uIP network 100.

The communication device 140 may perform such functions in response to processor 420 by executing sequences of instructions contained in a computer-readable medium, such as, for example, memory 430, a magnetic disk, or an optical disk. Such instructions may be read into memory 430 from another computer-readable medium, such as a storage device or from a separate device via communication interface 460.

The uIP network 100 and the communication device 140 illustrated in FIGS. 1-4 and the related discussion are intended to provide a brief, general description of a suitable computing environment in which the invention may be implemented. Although not required, the invention will be described, at least in part, in the general context of computer-executable instructions, such as program modules, being executed by the communication device 140, such as a communications server, or general purpose computer. Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations, including cellular devices, mobile communication devices, personal computers, handheld devices, multi-processor systems, microprocessor-based or programmable consumer electronics, and the like.

For illustrative purposes, the peer-to-peer communication establishment process will be described below in relation to the block diagrams shown in FIGS. 1-4.

Figure 5:
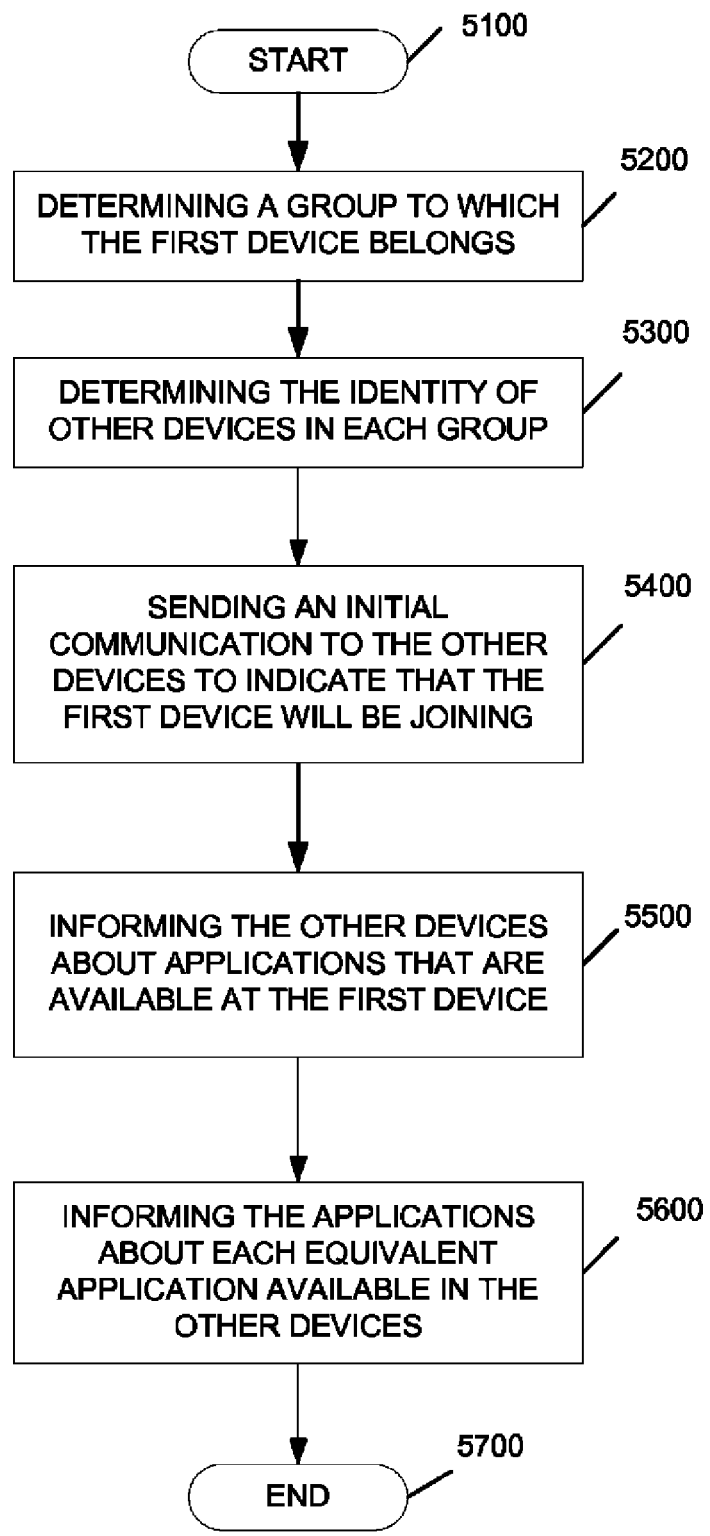
FIG. 5 is an exemplary flowchart illustrating one possible process for establishing peer-to-peer communications in accordance with one possible embodiment of the invention.

FIG. 5 is an exemplary flowchart illustrating some of the basic steps associated with a peer-to-peer communication establishment process in accordance with a possible embodiment of the invention. The process begins at step 5100 and continues to step 5200 where the uIP middleware module 310 determines a group to which a first device 140 belongs. This determination may be performed by a request from an application or from a preconfigured list of groups and their members, for example. For instance the group may be identified using a hierarchical format, such as phbook.alice.uipnet. In another embodiment, a flat name space may be used. In some other embodiments, a numeric identity name may be used. The numeric value may be randomly assigned or may itself be created using schemes such as a hashing function or using a directory lookup.

At step 5300, the uIP middleware module 310 determines the identity of other devices 150, 160 in the group. In an embodiment, this determination may be performed by sending a request to a contact point, such as the UIR, corresponding to the group and receiving a response with a list of devices in the group. The contact point can be determined by looking up a directory service (such as a Domain Name Server (DNS), Distributed Hash Table (DHT), Light Weight Directory Access Protocol (LDAP)) or from user input. In another embodiment the MEI may be use a configuration file that contains the identity of at least some members of a group. Additional exchange with other members in the group may be used to get information about more members in the group.

At step 5400, the uIP middleware module 310 sends an initial communication or "Hello message" to the other devices 150, 160 to indicate that the first device 140 will be joining the group. This message includes the device identifier, namely a capability list. The capability list may contain information such as physical capabilities such as bandwidth and processing power and service capability such as applications in a device 140. Each application registers itself with the MEI 330 indicating its service identifier and the group(s) to which it belongs, there by providing the MEI 330 with service capability information. In one embodiment, a string (such as "VoIP") which identifies a service may be used.

In another embodiment a destination port (such as 5060) corresponding to application may be used as the service identifier. Equivalent application use equivalent service identifiers enabling MEI to determine their equivalency. For example, an application in another device which provides VoIP service can register using a string "VoIP+Video" or "5060, 15000". On receiving a valid Hello from a peer uIP middleware module 310, a uIP middleware module 310 responds with a Hello Ack with information about its capabilities.

At step 5500, the uIP middleware module 310 informs the other devices 150, 160 in the group of applications that are available at the first device 140. As stated above, this may be part of the Hello message sent to other devices 150, 160 in some embodiments. Applications that are available at the first device comprises applications that reside in the first device and applications that are accessible through the first device. For instance, a VoIP application residing in a home phone may register with a MEI 330 in a residential gateway and becomes accessible other members of a group through the residential gateway.

At step 5600, the uIP middleware module 310 informs the applications about each equivalent application that is available in other devices in the group. The service identifier can enable MEI 330 to determine equivalent applications across devices in a group. MEI 330 can inform local applications about equivalent applications corresponding to other devices in a group (using callbacks for example). This enables applications to form application specific groups (called cliques) with in a larger group.

Members of a clique may act in concert to implement service logic. The MEI 330 may also provide an application with information about other services or applications available to the group. In one embodiment a clique may consist of one or more applications cooperating to provide and enhanced application of service.

The MEI 330 in a device may update a UIR corresponding to a group, to send packet sent to a specific service id (for example a specific uIP/port) only to a select list of members. MEI 330 may also send an update indicating that it will be passive member, i.e., all packets or selected packet (for e.g. sent to a specific service id) should not be sent to it.

The UIR 320 uses this information to determine the active set, i.e. the set of nodes to which the data packet destined to a particular service should be sent. The UIR 320 or MEI 330 may also notify another MEI to send packets directly to another MEI. For example if the size of active set is small, say there is only one recipient for a service id, on receiving a packet from a device the UIR may notify the sender to send packets directly to the one recipient.

When more recipients join, the UIR 320 or MEI 330 may revoke this notification. Similarly, an application (such as APP 340) in a device (device 140 for example) may notify its MEI 330 that the application will be the only recipient of packets to the service in a group. This can trigger the MEI 330 to send an update to the UIR 320.

The MEI 330 may also update the source MEI 330 of a packet on receiving data destined to the service in a group. Based on application specified intent, the local capability and the capability of other nodes in the group, MEI 330 may also update the registration with the UIR 320 indicating its intent to receive only notification about a packet and not the entire packet sent to a group. In one embodiment, there is one notification per packet. In another embodiment, a single message may be used to provide information about multiple packets. The process goes to step 5700 and ends.

The uIP middleware module 310 may register itself as the contact point in the group. In one embodiment, when the uIP middleware module 310 determines that there is no other entity registered as a contact point, then the uIP middleware module 310 registers itself as the contact point. In another embodiment, the uIP middleware module 310 may determine use the device and service capability information to determine that it is more suited to be the contact point and take over the function from another node.

The uIP middleware module 310 may determine group membership using a number of schemes. In an embodiment, every device 140, 150, 160 may be configured with the names of the group(s) to which the device belongs and the corresponding membership credentials such as a password or certificate. Applications may also request the MEI 330 (using an Application Programming Interface—API) to join group. They may also supply the credentials or the location of the credentials using an API. Each device 140, 150, 160 also has a device identifier which uniquely identifies the device.

When a device 140, 150, 160 boots up, its MEI 330 maps the group name(s) into a uIP and corresponding UIR's IP address and registers the IP address of the device 140, 150, 160 (the HoA for a mobile IP device) with UIR 320. The options for resolving group name into a uIP/UIR are using a directory server such as Domain Name System (DNS) lookup, Distributed Hash Table (DHT) lookup, a Lightweight Directory Access Protocol (LDAP), or a combination. For instance, consider the group name to be alice.motousers.net. A DNS lookup can be used to resolve the name into an overlay identifier termed uIP and a DHT lookup of uIP can provide the UIR's IP address. The UIR 320 may be one of Alice's devices that has registered itself as the UIR 320 in DHT. The DHT itself may be contacted by a DNS lookup of SRV DHT in domain motousers.net.

Once the MEI 330 knows the uIP and UIR 320 address, it registers the address of the MEI 330 with the UIR 320. In one embodiment, this message includes the device identifier to enable UIR 320 distinguish members from each other, a time stamp, an authentication code and an address to reach the member. The UIR 320 updates the membership list of the group and provides their address of other members in the response message. In one embodiment, the membership list in the UIR 320 consists of a device identifier, a timestamp and a reachable address corresponding to the member.

Figure 6:
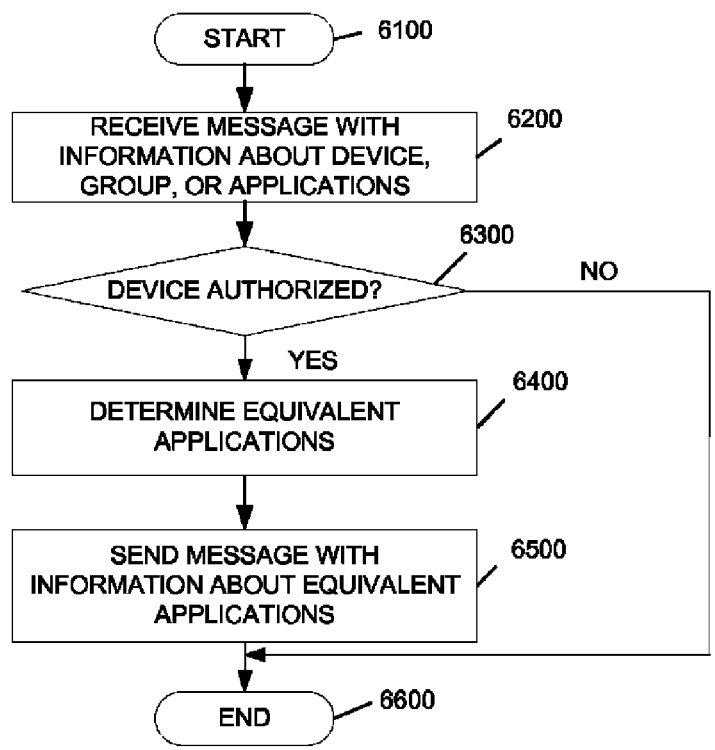
FIG. 6 is an exemplary flowchart illustrating some of the basic steps associated with a peer-to-peer communication establishment process in accordance with a possible embodiment of the invention.

FIG. 6 is an exemplary flowchart illustrating some of the basic steps associated with a peer-to-peer communication establishment process in accordance with a possible embodiment of the invention. The process begins at step 6100 and continues to step 6200 where the uIP middleware module 310 receives a message from a peer attempting to join a group. On receiving the message, at step 6300, the uIP middleware module 310 determines if the sender is authorized to join the group. In one example, this may verify an authentication code to determine that the sender can join a group. If the sender is not authorized, the process goes to step 6600, and ends.

In some embodiments, an error response may be sent to the sender. If the sender is authorized to join, then at step 6400, the uIP middleware module 310 determines the equivalent applications that are locally present. In one embodiment, this is determined by application registering with the middleware module using a service id. In another embodiment, the uIP middleware module 310 determines the local ports that are in use and uses that information to determine applications (for example, if port 5060 is in use then a SIP based VoIP is present locally).

At step 6500, the middleware module 310 sends a message to the sender providing information about local applications. In some embodiments the message may also include other information such as device capability. The process goes to 6600, and ends.

Figure 7:
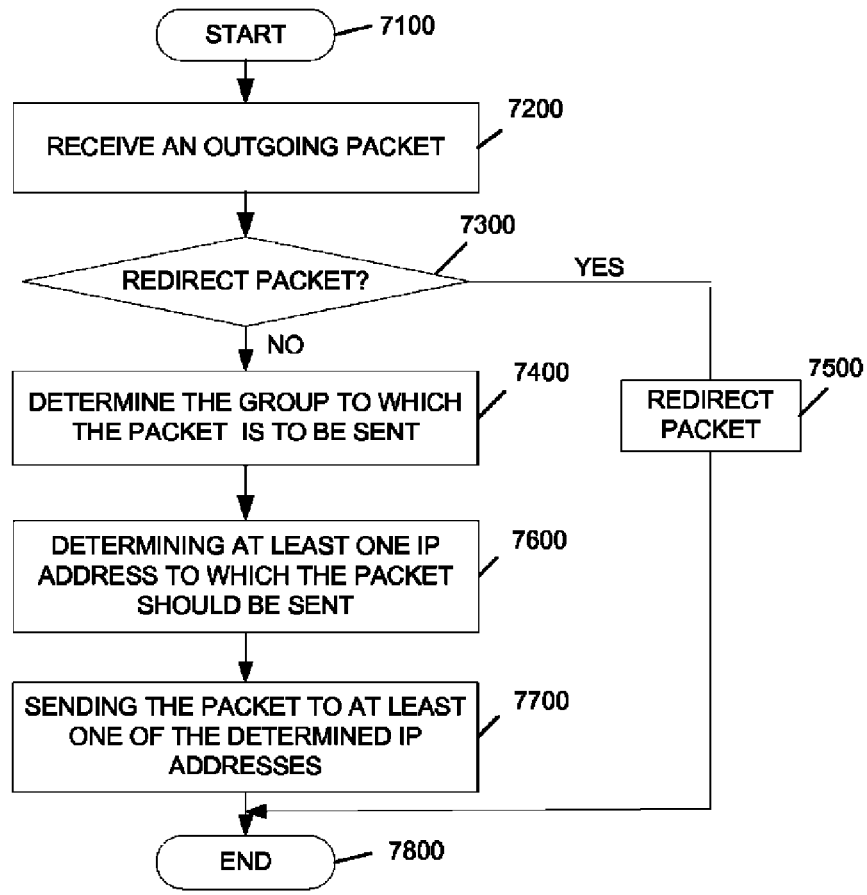
FIG. 7 is an exemplary flowchart illustrating one possible process for an outgoing data packet path in accordance with one possible embodiment of the invention.

FIG. 7 is an exemplary flowchart illustrating some of the basic steps associated with an MEI outgoing packet data path in accordance with a possible embodiment of the invention. The process begins at step 7100 and continues to step 7200, where the uIP middleware module 310 receives an outgoing packet. At step 7300, the uIP middleware module 310 determines if the packet should be redirected locally to another application. If an application has requested certain packets to be redirected (using an API for instance) and the packet has not previously been sent to that application, then MEI 330 directs the packet to the application. If the packet should be redirected, at step 7500 the uIP middleware module 310 redirects the packet and the process goes to step 7800, and ends.

If the packet should not be redirected, at step 7400, the uIP middleware module 310 determines the group to which the packet is to be sent. At step 7600, the uIP middleware module 310 determines at least one IP address to which the packet should be sent. In one embodiment, information such as socket descriptor used to send the packet is mapped into group identifier using a mapping table in the MEI 330. The group identifier is then mapped to the IP address of a contact point, such as UIR 320, corresponding to the group. At step 7700, the uIP middleware module 310 sends the packet. The process goes to step 7800, and ends.

The uIP middleware module 310 may also determine the group by mapping the IP address in the destination to an identity corresponding to a group. In some instances, MEI 320 may receive a message from UIR 330 or a peer MEI 330 indicating a mapping between a group identifier and an IP address. The uIP middleware module 310 may also use this information to determine the IP address to which the packet should be sent.

Figure 8:
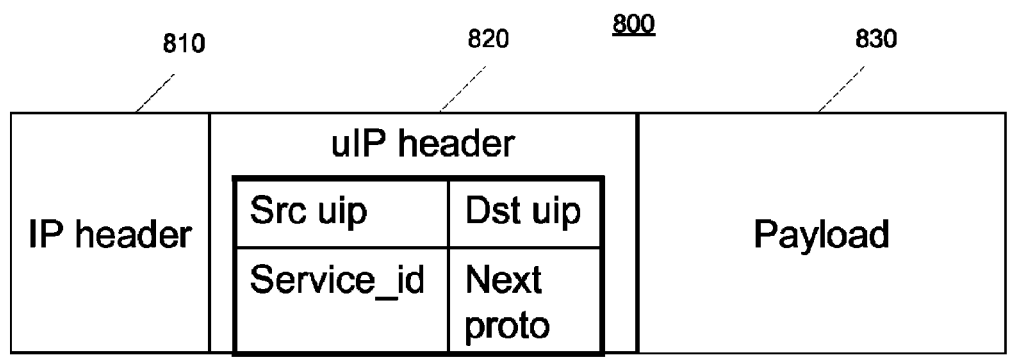
FIG. 8 shows an example of a uIP packet structure in accordance with one possible embodiment of the invention.

FIG. 8 shows an example of a uIP packet 800 under a possible embodiment of the invention. The uIP packet 800 may contain an IP header 810 followed by a uIP overlay network layer header 820. The uIP header 810 itself may contain the source uIP which identifies the sender of the packet, the destination uIP which identifies the receiving group, the service id which identifies the service in the group that should receive the packet, and the next protocol which identifies the type of the payload which follows the uIP header 810. Following the uIP header 810 is the payload 830. The payload 830 may contain any transport layer headers and data, for example.

Figure 9:
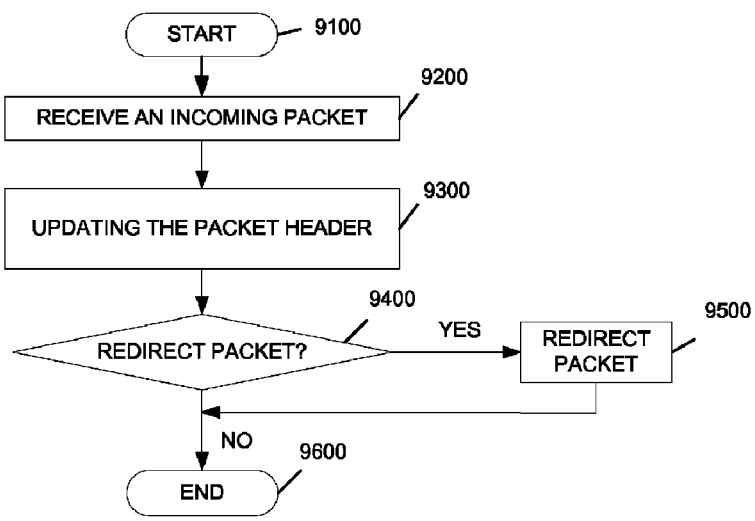
FIG. 9 is an exemplary flowchart illustrating one possible process for an incoming data packet path in accordance with one possible embodiment of the invention.

FIG. 9 is an exemplary flowchart illustrating some of the basic steps associated with an MEI 330 incoming packet data path in accordance with a possible embodiment of the invention. The process begins at step 9100 and continues to step 9200 where the uIP middleware module 310 receives an incoming data packet. At step 9300, the uIP middleware module 310 updates the packet header so that the packet can be processed by other applications in the device. In one embodiment, the uIP middleware module 310 uses uIP specific header information in the packet to determine a group corresponding to the packet, removes the uIP specific header fields in the packet and changes the IP header address from the a destination IP address corresponding to the device to an IP address corresponding to the group.

In another embodiment, the uIP middleware module 310 removes the uIP specific header fields, sets the destination IP address to a particular interface IP address in the device and updates the checksum field in the network and transport headers.

At step 9400, the uIP middleware module 310 determines if the packet should be redirected locally to another application. In one embodiment, an application can use an API to request that packets destined to some service id in a group should be redirected to that application. If the packet should be redirected, at step 9500, the uIP middleware module 310 redirects the packet and the process goes to step 9600 and ends.

In one embodiment, packet redirection is achieved by changing the destination port in the packet and recomputing the checksum. In another embodiment, the contents of the packet are sent to the application in a new message and the processing of the original packet is paused until a response is received from the application. If the packet should not be redirected, the process goes to step 9600, and ends.

Figure 10:
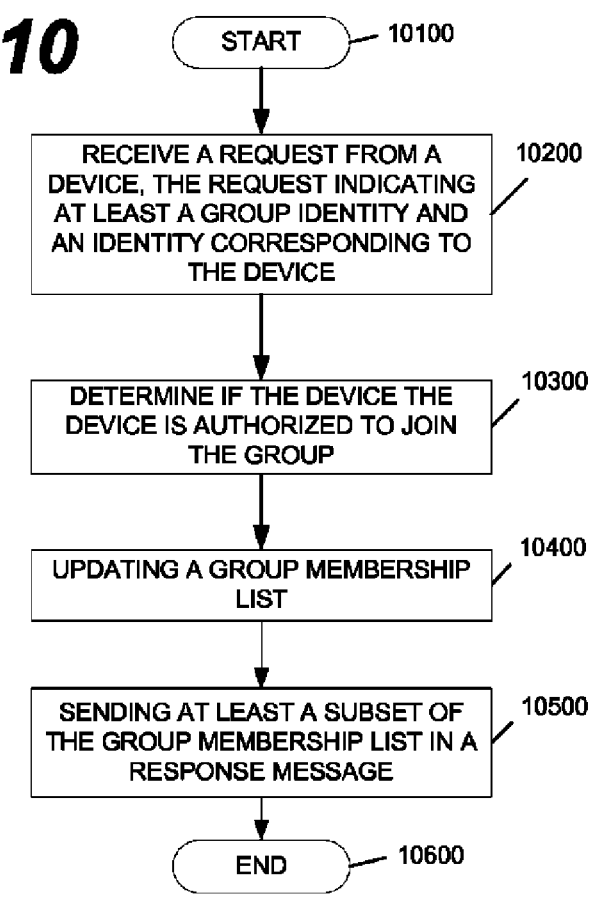
FIG. 10 is an exemplary flowchart illustrating one possible process for an UIR control path in accordance with one possible embodiment of the invention.

FIG. 10 is an exemplary flowchart illustrating some of the basic steps associated with an UIR control path in accordance with a possible embodiment of the invention. The process begins at step 10100 and continues to step 10200, where the uIP middleware module 310 receives a request from a device 150, 160. The received request may indicate at least a group identity and an identity corresponding to a device 150, 160. The request may also contain information such a contact address of the device (such as home IP address of the device), an authentication code that is generated using the credentials necessary to join the group, a message id and a sequence number to enable UIR 320 to identify retransmissions and out-of-order packets.

At step 10300, the uIP middleware module 310 determines that the device is authorized to join the group. In one embodiment, the uIP middleware module 310 has a key corresponding to the group that can be used to verify the authentication code and ensure that the sender is authorized to join. In another embodiment, the module 310 has an authorized list of device id that can join the group and a key corresponding to each device id. The uIP middleware module 310 may then use the key to validate the identity of the sender using the key and then accept the device if the device id is in the authorized list.

At step 10400, the uIP middleware module 310 updates a group membership list. In one embodiment, the membership list consists of device id, the contact address for the device and a timestamp. At step 10500, the uIP middleware module 310 sends at least a subset of the group membership list in a response message. The process goes to step 10600, and ends. The UIR 320 may also use soft-state to timeout old entries in the membership list.

Figure 11:
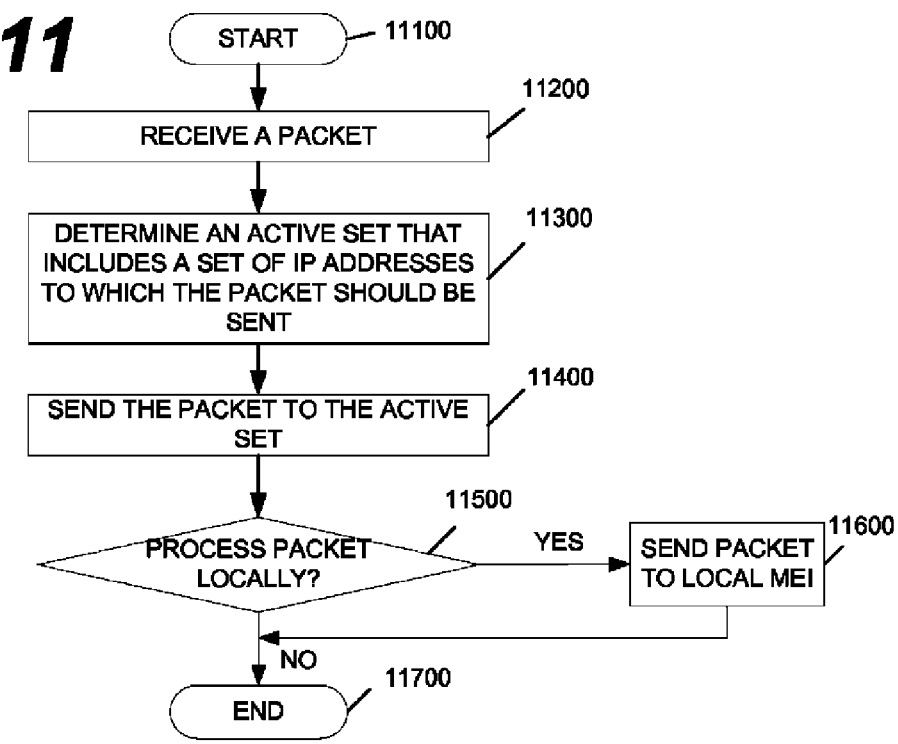
FIG. 11 is an exemplary flowchart illustrating one possible process for an UIR data path in accordance with one possible embodiment of the invention.

FIG. 11 is an exemplary flowchart illustrating some of the basic steps associated with an UIR data path in accordance with a possible embodiment of the invention. The process begins at step 11100 and continues to step 11200, where the uIP middleware module 310 receives a packet. At step 11300, the uIP middleware module 310 determines an active set that includes a set of IP addresses to which the packet should be sent. In one embodiment, the active set may include all IP address in the group membership list except those node that have sent a request indicating no packet be sent to them. In another embodiment, the active set may include only those nodes which have send a request indicating their intent to receive packet destined to a particular service id in group.

At step 11400, the uIP middleware module 310 sends the packet to the active set. In one embodiment, the entire packet may be sent to all members in the active set. In another embodiment, the entire packet may be sent to only one member and only an indication about packet is sent to other members.

At step 11500, the uIP middleware module 310 determines whether it should also process the packet locally. If the uIP middleware module 310 determines that it should process the packet locally, at step 11600, the uIP middleware module 310 sends the packet to the local MEI 330. For example, if the UIR 320 is also an active member of the group the packet is scheduled for local processing. The process then goes to step 11700, and ends. If the uIP middleware module 310 determines that it should not process the packet locally, the process goes to step 11700, and ends.

The following is an example message flow in accordance with a possible embodiment of the invention:

Alice powers up her home phone/gateway. She has an identity of "alice.motousr.net". It functions as a group name that the uIP middleware 310 in Alice's devices will become part of.

uIP middleware 310 does a lookup of alice.motousr.net in a DHT. The IP address of a node in the DHT is obtained by a DNS lookup of dht.motousr.net.

The uIP middleware 310 determines that there are no registered UIRs. So the phone registers itself as UIR 320.

Alice powers up her mobile phone. Mobile's uIP middleware module looks up alice.motousr.net in a DHT and finds home device as UIR 320.

Mobile contacts home device, determines that home device should remain the UIR 320 as it has better capabilities Alice's mobile informs the home device about the applications in mobile phone (e.g. VoIP application, a location tracking application).

The home device informs the mobile phone about its applications (e.g. a VoIP/video phone, word processing application).

The MEI 330 in the mobile informs the local VoIP application that there is an equivalent application in the home phone.

The MEI 330 in the home phone also informs VoIP application about the application in mobile phone.

MEI 330 in mobile phone sends a message to the UIR 320 indicating that it need not receive packets sent to VoIP.

Say Bob contacts Alice.motousr.net using VoIP. Application in Bob's device looks up alice.motousr.net.

MEI 330 maps this to a uIP address and uses the uIP address as a DHT key to lookup the corresponding UIR 320. MEI 330 maps the uIP to an IP compatible address (for example returns first 32 bits of uip addr as IP addr) and returns it to the application. MEI 330 also maintains a table of this mapping so that it can perform the reverse mapping.

An application in Bob's device sends packets to this IP addr. MEI 330 in Bob's device determines the group corresponding to the packet sent by application by mapping the IP address to uIP. It then maps the uIP to a UIR address and sends packet to corresponding UIR 320.

UIR 320 sends packets to the active devices registered for the group. In this case, as MEI 330 in home phone will be the only node in the active list.

MEI 330 in the home device sends packet to the application.

Applications may then process the packet individually or collectively based on service logic.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the uIP middleware module 310 in FIGS. 3 and 4 each processing the content in various possible ways. It does not necessarily need to be one system used by all end users. Accordingly, the appended claims and their legal equivalents should only define the invention, rather than any specific examples given.

We claim:

1. A method of establishing peer-to-peer communications, comprising:
   determining a group to which a first device belongs;
   determining if a contact point exists for the group, wherein if it is determined that there is no contact point for the group, then registering as the contact point for the group, and if it is determined that there is a contact point for the group, then obtaining from the contact point a list comprising other devices in the group;
   sending an initial communication to at least one device in the group to indicate that the first device will be joining the group;
   informing the at least one device concerning information about applications that are available at the first device;
   receiving a request message, the message including a group identification;
   creating an overlay identifier from the group identification;
   determining a first IP compatible address of the overlay identifier and a second IP address corresponding to the contact point for the group;
   responding to the request with the first IP compatible address;
   maintaining a mapping between a overlay address, an IP compatible version of the overlay address and an IP address;
   receiving a packet destined to an IP compatible version of overlay address; and
   transmitting the received packet to the corresponding IP address in the mapping.

2. The method of claim 1, further comprising informing the applications about another application that is available in one or more other device in the group.

3. The method of claim 1, wherein registering the first device comprises updating a directory service.

4. The method of claim 1, wherein the identity of other devices is determined using a configured list with information about at least one other member of the group.

5. The method of claim 1, wherein the determination of the identity of other devices comprises:
   sending a request to a contact point for the group; and
   receiving a response from at least one other device in the group.

6. The method of claim 1, further comprising:
   receiving a packet; and
   removing overlay network header information from the packet.

7. The method of claim 6, further comprising redirecting the packet to a different transport layer port number.

* * * * *